Jan. 20, 1953  J. C. MOORE  2,625,772
GRINDING MACHINE
Filed Jan. 11, 1951
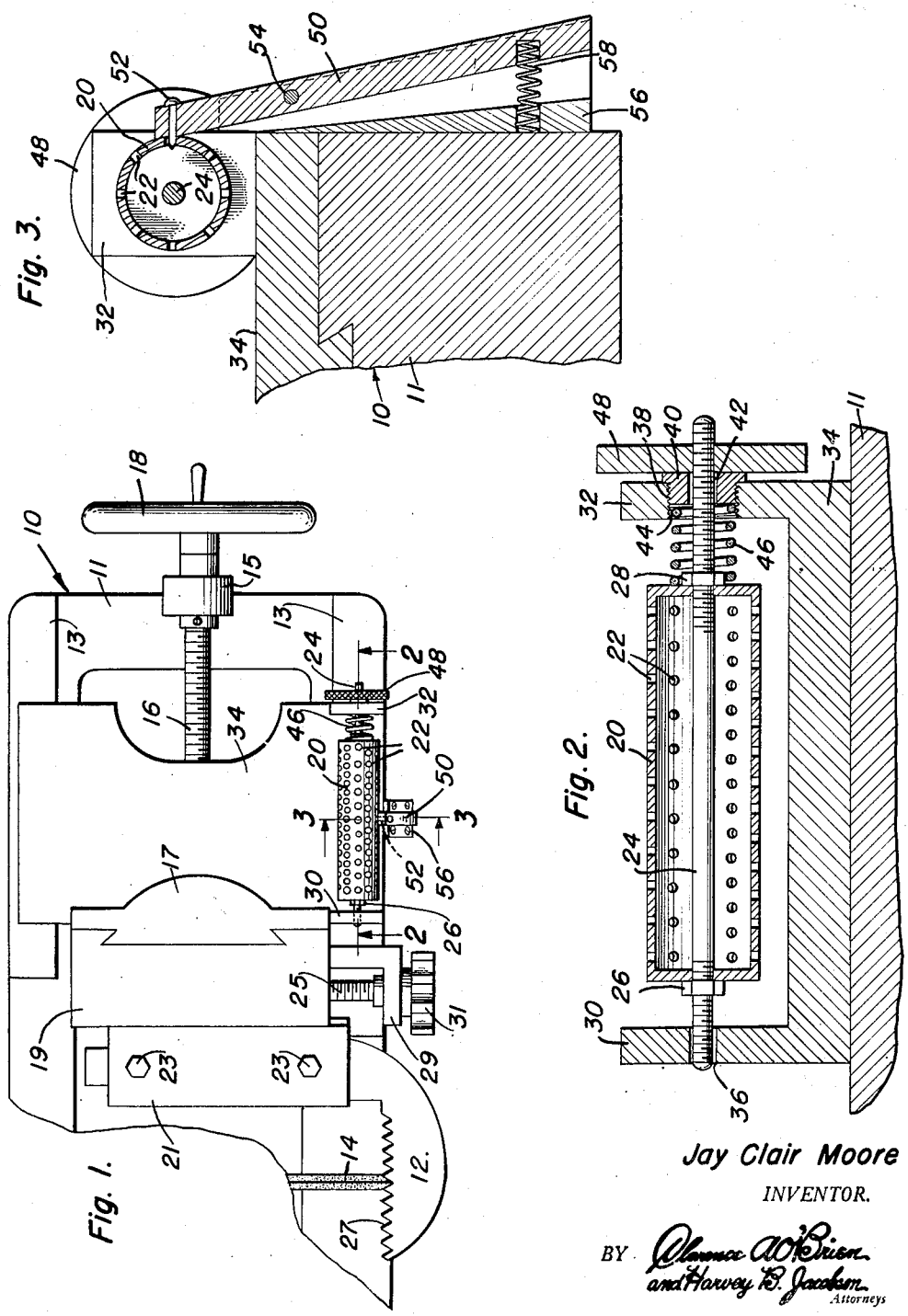
Jay Clair Moore
INVENTOR.

Patented Jan. 20, 1953

2,625,772

UNITED STATES PATENT OFFICE 2,625,772

GRINDING MACHINE

Jay Clair Moore, Fredonia, Pa.

Application January 11, 1951, Serial No. 205,451

1 Claim. (Cl. 51—72)

This invention relates to the class of machine tools and more particularly to a novel feed mechanism for use in grinding machines.

An object of this invention is the provision of a feed mechanism for a grinding machine wherein the jaw of a wrench placed therein for the reconditioning of the teeth on the jaw may be properly fed to the grinding machine in accordance with the number of teeth on the jaw of the wrench and the spacing of the teeth on the jaw thereof.

A further object of this invention is the provision of a feed mechanism which is positive in its action so that the work engaging jaw of a wrench can be properly reconditioned according to the number of teeth on the jaw with precision, the feed mechanism consisting of a spacing tube having calibrated rows of holes therethrough which are successively engaged by means connected to the wrench support.

Still further objects of this invention reside in the provision of a feed mechanism including a spacing tube that is strong, durable, simple in construction, thoroughly reliable and efficient in operation, and which will permit precise operation of the grinder while being inexpensive to manufacture and install.

These, together with the various ancillary objects of the invention which will become apparent as the following description proceeds, are obtained by this spacing tube, a preferred embodiment of which has been illustrated in the accompanying drawings, by way of example only, wherein:

Figure 1 is a top plan view of a section of a grinding machine on which the invention is installed;

Figure 2 is a vertical sectional detail as taken along the plane of line 2—2 in Figure 1; and, Figure 3 is an enlarged vertical sectional detail as taken along the plane of line 3—3 in Figure 1.

Referring now to the drawing in detail, it will be seen that reference character 10 designates generally a grinding machine comprising a base 11 having on one end portion thereof a pair of spaced, parallel rails or guides 13. A plate or carriage 34 is slidable on the rails 13. A screw shaft 16 is threadedly connected to the carriage 34 for adjusting same longitudinally on the rails 13, said screw shaft being rotatably anchored in a bearing 15 which is provided therefor on one end portion of the base 11. Fixed on one end portion of the screw shaft 16 is an operating wheel 18.

The carriage 34 includes a member 17 having mounted thereon a block 19. Mounted for transverse sliding adjustment on the member 19 is a work holder or clamp 21 for receiving a wrench jaw, as at 12. The clamp 21 comprises bolts or set screws 23 which secure the jaw 12 in position. A hand screw 25 is threadedly connected to the slidable clamp 21 for adjusting the toothed face 27 of the jaw 12 toward or away from the periphery of the usual grinding wheel 14 of the machine 10. The screw shaft 25 is journaled in a bearing 29 on the block 19 and provided with an operating knob 31.

Mounted on the carriage 34 is a spacing mechanism including a tubular gauge or indexing head 20. The gauge 20 is provided with spaced rows of calibrated and spaced holes 22 therethrough. These holes are calibrated in their spacing from each other in accordance to the space relationship of teeth formed in the gripping surfaces of jaws of wrenches which may be reconditioned on this machine. The gauge 20 is mounted on a threaded shaft 24 and held in a locked position by nuts 26 and 28. The shaft 24 is slidably receivable within support members 30 and 32 which are integrally formed with the carriage 34 to form an arbor for the gauge. The supporting member 30 is provided with an aperture 36 therethrough for reception of one end of the shaft and a threaded opening 38 is formed in the support 32. A bushing 40 is threadedly secured to the support 32 within the opening 38. The bushing has a hole 42 therethrough for the reception of the other end of the threaded shaft 24. It is to be noted that the bushing 40 does not extend the full thickness of the support member 32 in order to form a seat 44 for a coil spring 46 coaxial with the shaft 24, which spring biases the bushing 40 and the end wall of the gauge 20. A handle 48 is threadedly secured on the end of the shaft 24 and is continuously urged by the spring 46 into engagement with the bushing 40. Hence, upon rotation of the handle 48 the shaft and hence the tubular gauge 20 may be moved longitudinally.

Cooperating with the holes 22 is a latching pawl or dog 50 which is provided with a keeper pin 52 to enter the selective holes 22 in a determined row thereof, so as to hold work piece supporting means in a definite place with accuracy for the sharpening of a tooth on the wrench jaw 12. The pawl or dog 50 is pivoted as at 54 in a fitting 56 secured to the base 11. The pawl or dog 50 is held releasably in latching position by a spring 58 acting thereon.

The gauge 20 is turned to bring a row of holes 22 into position for latching engagement with the pawl or dog 50 in successive relationship on the catch for the work piece is adjusted by the screw 16 to bring the jaw 12 of the wrench into position for reconditioning the teeth on the wrench by the grinding wheel 14 which at its periphery recuts and sharpens the teeth on the jaw of the wrench.

Since from the foregoing the construction and advantages of this spacing tube for feed mechanisms of grinders is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

A grinding machine comprising a base, a carriage slidable on said base, a work holder on said carriage, a grinding wheel, means operatively connected to the carriage for adjusting the holder relative to the wheel, and means for releasably securing the carriage in adjusted position, the last-named means including a pair of spaced, opposed uprights on the carriage having aligned openings therein, a shaft including threaded end portions extending through the openings, an indexing head having series of spaced holes therein, mounted for rotary and longitudinal adjustment on the shaft between the uprights, nuts on the threaded end portions of the shaft for securing the indexing head in adjusted position thereon, a bushing threadedly mounted in one of the openings and encircling the shaft, a coil spring encircling the shaft between the bushing and the indexing head for yieldingly urging the latter in one longitudinal direction between the uprights, a disk threadedly mounted on one end portion of the shaft and engaged with the bushing for adjusting the indexing head in the opposite direction and for frictionally securing said head in rotatably adjusted position, and a spring-pressed dog on the base engageable selectively in the holes in the indexing head for releasably securing the carriage in adjusted position.

JAY CLAIR MOORE.

REFERENCES CITED

The following references are of record in the file of this patent:

UNITED STATES PATENTS

| Number | Name | Date |
|---|---|---|
| 1,070,638 | Thullen | Aug. 19, 1913 |
| 1,390,726 | Scheiwer et al. | Sept. 13, 1921 |
| 1,649,695 | Higgins | Nov. 15, 1927 |
| 1,662,078 | Severson | Mar. 13, 1928 |
| 1,993,418 | Smyser | Mar. 5, 1935 |
| 2,220,490 | Ott et al. | Nov. 5, 1940 |